F. THORNE.
TRIPOD.
APPLICATION FILED JUNE 28, 1913.
1,186,707.
Patented June 13, 1916.
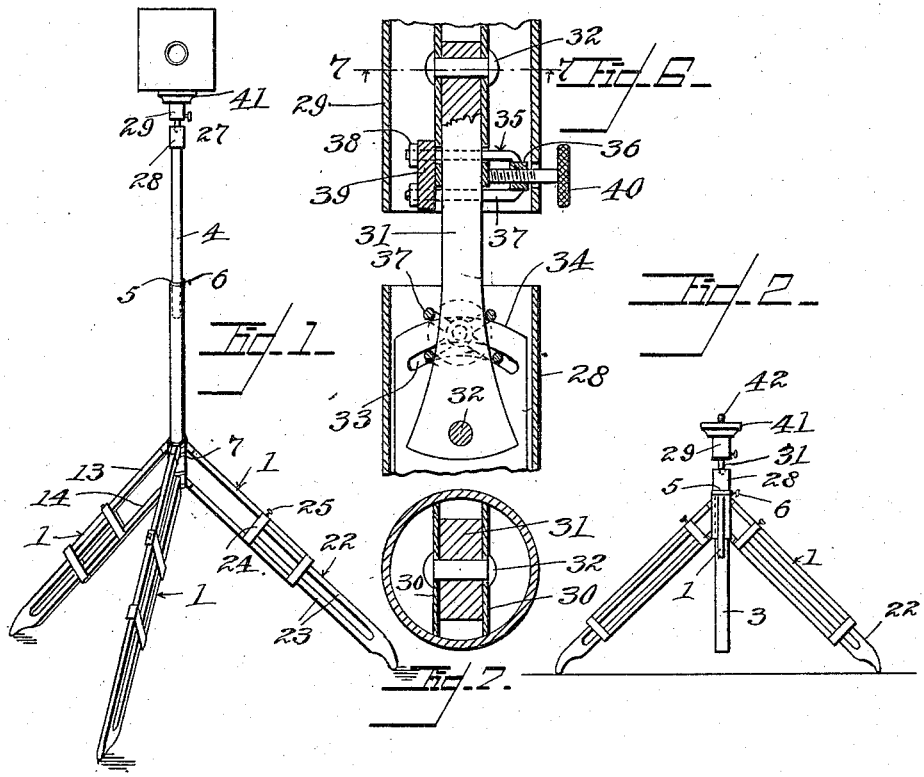
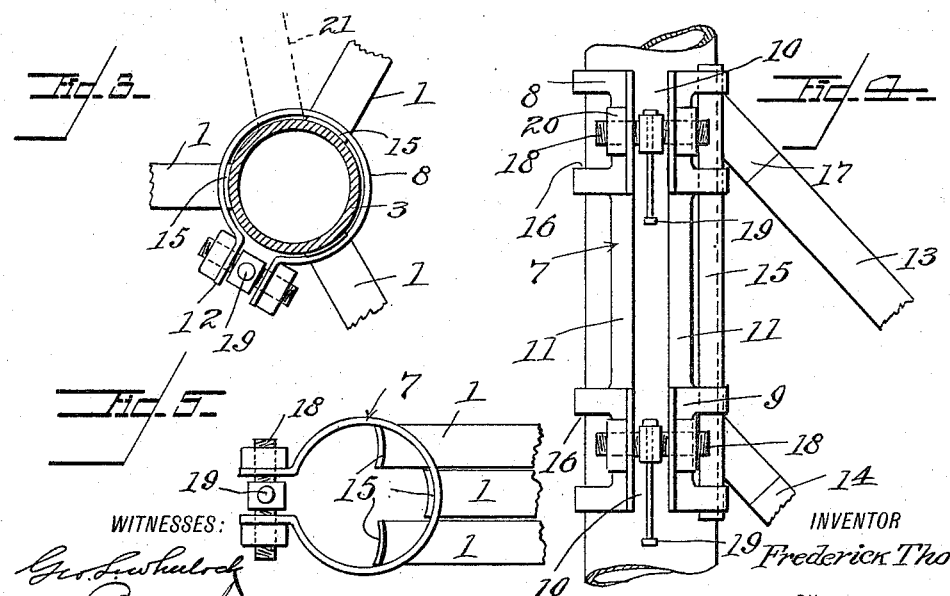
WITNESSES:
INVENTOR
Frederick Thorne
BY
Newell & Neal
ATTORNEYS

UNITED STATES PATENT OFFICE.

FREDERICK THORNE, OF NEW YORK, N. Y.

TRIPOD.

1,186,707.  Specification of Letters Patent.  Patented June 13, 1916.

Application filed June 28, 1913. Serial No. 776,218.

*To all whom it may concern:*

Be it known that I, FREDERICK THORNE, a citizen of the United States, residing at New York city, New York, have invented certain new and useful Improvements in Tripods, of which the following is a clear, full, and exact description.

This invention relates to tripods such as used for supporting cameras and for other purposes where an article such as a camera must be supported in a fixed position and in a manner which will enable it to be adjusted.

A principal object of the invention is to produce a tripod having an extremely wide range of vertical adjustment. A wide range of adjustment such as this is very desirable in taking portraits, for in such work it is necessary to have the lens substantially on a level with the head which is being photographed.

A further object of the invention is to produce a tripod having a construction which will insure rigidity of the post or stem which supports the camera and which at the same time will possess adjustable features in connection with the legs.

A further object of the invention is to provide such a construction in which the legs of the camera can be readily brought together so as to occupy small space without necessitating their detachment.

Further objects of the invention will appear hereafter.

The invention consists in the general combination of parts and simplicity of details hereinafter described, all of which contribute to produce an efficient tripod.

A preferred embodiment of my invention will be particularly described in the following specification, while the broad scope of my invention will be pointed out in the appended claims.

In the drawings, Figure 1 is a perspective showing a tripod embodying my invention and showing the parts in an extended relation so that the camera will be held in an elevated position; Fig. 2 is a side elevation with certain parts broken away and illustrating the tripod embodying my invention and in which the parts are shown in their least extended relation so that the camera will be supported at the lowest possible level; Fig. 3 is a horizontal cross-section through the post of the tripod just above the point of attachment of the legs and particularly illustrating the manner in which the legs are secured in position; Fig. 4 is a side elevation showing a short portion of the post and illustrating a portion of a leg together with means for securing the legs to the post; Fig. 5 is a view which is broken away, showing the inner ends of the legs of the tripod in the position which they assume when the legs of the tripod are folded together after having been detached from the post; Fig. 6 is a vertical section through a joint by means of which I prefer to connect the camera seat with the stem or post of the tripod; this joint enables the angular position of the tripod of the camera to be adjusted and at the same time insures that the camera will be held rigidly; and Fig. 7 is a horizontal section on line 7—7 of Fig. 6.

Referring more particularly to the parts, the tripod preferably comprises a plurality of inclined legs 1, said legs being attached so as to radiate from a central post. The central post consists simply of a lower section or tubular case 3 into the upper end of which there passes a telescoping upper section 4. The upper section 4 is provided with a collar 5 which can be clamped to it by means of a set screw 6 so that the upper section 4 can be held in any desired extended position. The legs 1 are preferably not attached directly to the post but are preferably secured thereto by means of a sleeve 7, a preferred form of which is particularly illustrated in Figs. 3 to 5. The sleeve preferably comprises an upper ring 8 and a lower ring 9, said rings being preferably split so as to form an opening or gap 10, and at these gaps the rings may be connected by longitudinal bars 11; also at the gaps 10 the ends of the ring are preferably turned outwardly so as to form ears 12 for a purpose which will appear hereinafter. The sleeve 7 is the means which I prefer to use for clamping or securing the legs 1 to the post, and I prefer to connect the legs to the sleeve in such a way that they will retain themselves on the sleeve and be freely movable circumferentially about the post so that their radial position may be altered if desired. I prefer also to construct the legs of truss form so that they have considerable rigidity in a vertical plane. For these reasons I prefer to construct the legs with upper truss bars 13 and parallel lower truss bars 14. These truss bars are preferably inclined as shown and are preferably connected at their inner ends by elongated curved shoes or splits 15 which are adapted to seat against the curved surface of the post. In order to hold the legs on the sleeve, I prefer to provide the rings 8 and 9 with wide circumferential slots 16, and through these slots sockets 17 project which receive the ends of the bars 13 and 14 preferably as shown in Fig. 4.

In order to enable all of the legs to be clamped simultaneously to the center post, I prefer to provide clamping screws 18 which are disposed horizontally and connect the ears 12. These screws 18 have a left-hand thread on one end and a right-hand thread on the other so that when they are turned by means of a loose pin 19 they will draw the ears 12 toward each other. On the outer side of the ears, I prefer to provide nuts 20 which receive the ends of the screw as indicated. With this arrangement for attaching the legs to the center post, it will be evident that the three legs may be set in the usual manner 120° apart as indicated in Fig. 3 in full lines, or if desired for any particular reason as for instance where the camera is used out-of-doors and at an obstructed position, one of the legs may be set up in an abnormal position as indicated by the dotted lines 21 in Fig. 3. When the tripod is to be taken down, the legs can be readily removed from the post by loosening the sleeve 7 and it will be seen that when this is done, the legs can all be folded together so as to lie as indicated in Fig. 5 and without their becoming detached from the sleeve. This renders the tripod very convenient in carrying it from place to place.

The legs 1 are preferably provided with sliding extensions 22 preferably comprising parallel bars 23 which run against the inner sides of the bars 13 and 14, the upper ends of the bars 23 being provided with a cross-head 24 which may be provided with a clamping means such as a set screw 25 for clamping these parts in any adjusted extended position. The lower ends of the extensions 23 are preferably formed into feet which rest upon the floor or the ground.

At the upper end of the post section 4, I provide a universal joint 27, the preferred construction of which is illustrated in Fig. 6. This joint comprises a lower head 28 which is preferably of tubular form and secured rigidly to the upper end of the post section 4. A similar upper head 29 is provided and these heads are provided with transverse webs 30 preferably two in number formed of flexible or resilient plates. Between these plates I prefer to provide a shank 31 which consists of an elongated bar attached by pivots 32 to the webs or plates 30. The webs of one of the heads are disposed in a plane substantially at right angles to the webs of the opposite head so that the pivots 32 present two axes of movement for the shank which are disposed substantially at right angles to each other. In order to secure the shank to the heads in any desired position, I prefer to provide the webs with the slots 33 which are disposed circumferentially about the axes of the pivots 32, and the plates or webs 30 are preferably formed with similarly curved outer edges 34. These slots 33 are for the purpose of attaching shackles 35 for clamping the parts together. Each of these shackles preferably consists of a hub 36 from which four bars 37 extend, two of said bars extending through the slots 33 and the other two extending across the edges 34. The ends of these bars 37 are preferably threaded to receive nuts 38 which clamp down upon a plate 39 which seats against the outer side of the adjacent web 30. The hub 36 is threaded so as to receive a clamping screw 40 which passes loosely through the side wall of each head so that the end of the clamping screw comes upon the outer face of the web which lies opposite to the plate 39. Evidently by tightening the screws 40, the webs 30 can be clamped tightly against the shank; and on account of the presence of the slot, the angular position of the shank in each head can be adjusted within certain limits as desired.

The upper head 29 is provided with a seat preferably in the form of a plate 41 upon which a camera 42 or other device may be mounted. This seat 41 may be provided with a threaded stud 42 or any other means for attaching it to the camera or other instrument.

It is to be understood that the embodiment of the invention described above is only one of the many embodiments the invention may take, and I therefore do not wish to be limited in the practice of the invention nor in my claims to the form or embodiment described.

What I claim as new is:—

1. A tripod comprising, in combination, a sleeve, legs in the form of trusses having truss-bars engaging with said sleeve adjacent the upper end thereof and having truss-bars rigid with said first named truss-bars attached to said sleeve adjacent the lower end thereof, and a post adjustable up and down at said sleeve.

2. A tripod comprising, in combination, a sleeve, legs in the form of trusses having truss-bars engaging with said sleeve adjacent the upper end thereof and having truss-bars rigid with said first named truss-bars attached to said sleeve adjacent the lower end thereof, and a post adjustable up and down through said sleeve, said legs each including an upper section attached to said sleeve and an adjustable extensible section carried in said upper leg section.

3. A tripod comprising, in combination, a sleeve, legs in the form of trusses having truss-bars attached to said sleeve adjacent the upper end thereof and having truss-bars attached to said sleeve adjacent the lower end thereof, a post adjustable up and down through said sleeve, said legs each including an upper section attached to said sleeve and an adjustable extensible section carried on said upper leg section, a supporting seat on the upper end of said post and a universal joint connecting said seat to said post.

4. A tripod comprising in combination, a post, a plurality of radial legs movable independently of each other circumferentially about said post and means for fixing all of said legs simultaneously to said post.

5. A tripod comprising in combination, a post, a plurality of radial legs disposed around and freely movable circumferentially about said post, and means for fixing all of said legs simultaneously to said post.

6. A tripod comprising in combination, a post, a plurality of radial legs disposed circumferentially about said post, said legs having splints adapted to lie against the side of said post, and a sleeve carrying all of said legs and having means for clamping said splints to said post to fix said legs thereto.

7. A tripod comprising in combination, a post, a plurality of radial legs disposed circumferentially about said post, said legs having upper bars and lower bars, and splints connecting said bars and adapted to lie against the side of said post, and a sleeve encircling said splints and having means for clamping said splints against said post to secure said legs.

8. A tripod comprising in combination, a post, a split sleeve having means for clamping the same to said post, said split sleeve having an upper circumferential slot and a lower circumferential slot, a plurality of legs having upper truss-bars passing through said upper slots, and lower truss-bars passing through said lower slots, and splints connecting said truss-bars respectively encircled by said sleeve and retaining said truss legs on said sleeve.

9. A tripod comprising in combination, a post, a split sleeve disposed around said post, legs having upper truss-bars connecting with said sleeve near the upper end thereof and having lower truss-bars connecting with said sleeve near the lower end thereof, said legs having splints seating against the surface of said post, clamping means at the upper end of said sleeve for clamping the upper end of said splint to the post, and clamping means at the lower end of said sleeve for clamping the lower ends of the splints to said post.

10. A tripod comprising in combination, a sleeve, a plurality of legs in the form of truss-bars, each truss-bar having an upper bar and a lower bar rigid therewith, said truss-bars being connected with said sleeve, and a post disposed within said sleeve and held by said sleeve.

Signed at New York this 26th day of June 1913.

FREDERICK THORNE.

Witnesses:
F. D. AMMEN,
F. JACKSON.